United States Patent [19]

Takagi et al.

[11] Patent Number: 5,726,235
[45] Date of Patent: Mar. 10, 1998

[54] AQUEOUS COATING COMPOSITION AND ITS PREPARATION

[75] Inventors: Motoyuki Takagi, Toyonaka; Takeshi Baba, Mino, both of Japan

[73] Assignee: National Starch and Chemical Investment Holding Corporation, Wilmington, Del.

[21] Appl. No.: 422,406

[22] Filed: Apr. 14, 1995

[30] Foreign Application Priority Data

May 12, 1994 [JP] Japan .................. 6-098842

[51] Int. Cl.$^6$ .................................. C08F 2/16
[52] U.S. Cl. .................. 524/458; 523/201; 523/402; 523/403; 523/409; 523/411; 523/412; 524/460; 524/492; 524/493; 524/517; 524/521
[58] Field of Search ............... 524/458, 492, 524/493, 221, 460, 517; 523/201, 402, 403, 409, 411, 412

[56] References Cited

U.S. PATENT DOCUMENTS

| | | | |
|---|---|---|---|
| 5,118,752 | 6/1992 | Chang et al. | 524/458 X |
| 5,162,420 | 11/1992 | Chang et al. | 524/458 X |
| 5,244,959 | 9/1993 | Hazan et al. | 524/504 |
| 5,250,605 | 10/1993 | Hazan et al. | 525/100 X |
| 5,252,660 | 10/1993 | Hazan et al. | 525/100 X |
| 5,258,443 | 11/1993 | Nield et al. | 525/100 X |
| 5,306,765 | 4/1994 | Kuriyama et al. | 524/458 X |
| 5,461,102 | 10/1995 | Masuda et al. | 524/458 |

FOREIGN PATENT DOCUMENTS

| | | |
|---|---|---|
| 0 007 190 | 7/1978 | European Pat. Off. |
| 0 142 784 | 11/1983 | European Pat. Off. |
| 2 003 997 | 1/1970 | Germany. |
| 63-334354 | 12/1988 | Japan. |

*Primary Examiner*—Judy M. Reddick
*Attorney, Agent, or Firm*—Ellen T. Dec

[57] ABSTRACT

An aqueous coating composition wherein fine grains coated with water soluble resin composed of three monomers are contained in aqueous medium, each of said fine grains are composed of aqueous resin of ethylenically unsaturated monomer and aqueous colloidal silica, which are coexistent each other. Therefore, the aqueous coating composition is superior in not only contamination resistance, but also waterproof and weatherproof. The paint film formed by the above aqueous coating composition is excellent in its strength. Accordingly, this aqueous coating composition is useful for a coating base of exterior type coating material.

6 Claims, No Drawings

AQUEOUS COATING COMPOSITION AND ITS PREPARATION

FIELD OF THE INVENTION

The present invention relates to aqueous coating composition employed to form a coating base superior in contamination resistance, especially in rain-permeant contamination resistance as exterior type coating material and its preparation.

BACKGROUND OF THE INVENTION

Heretofore a number of techniques have been proposed as exterior type coating material to improve contamination resistance. Especially, countermeasures for rain-permeant contamination resistance among such contamination resistance have been focused upon recently. As a countermeasure, a method of improving hydrophilic property of a formed coat surface is proposed and employed partly. Specifically, there are methods of ① mixing hydrophilic material comprising surface active agents into conventional coat, ② mixing water soluble oligomer into a conventional coat, ③ mixing colloidal silica into a conventional coat, or the like.

However, since it takes a longer time to dry a coat due to additional material in said methods ① and ②, there are risks of blistering, re-emulsification and the like by rainfall after coating. In the meantime, as for said method ③, although waterproof and dryness are good, there is a risk of chalking (powdering on a coat surface) due to outdoor exposure for a long time, resulting in deterioration of the coat surface.

OBJECT OF THE INVENTION

Accordingly, the object of the invention is to provide aqueous coating composition superior in not only contamination resistance, but also waterproof, weatherproof and coat strength, and preparation thereof.

SUMMARY OF THE INVENTION

To accomplish the above object, a first gist of the present invention is directed to the aqueous coating composition wherein coated fine grains are contained in aqueous medium, each of said fine grains having a structure that below-defined components (A) and (B), which are coexistent each other, are covered with a below-defined component (C), characterizing that a ratio by weight for components (A) to (C) is set at (A): (B): (C)=(45 to 85): (5 to 25): (10 to 30)

(A) Aqueous resin comprising an ethylenically unsaturated monomer
(B) Aqueous colloidal silica
(C) Water soluble resin comprising a copolymer having a structural unit derived from below-defined components (a) to (c) as a molecular structure
(a) An alkoxysilane monomer capable of radical polymerization
(b) A hydrophilic monomer having unsaturated double bond
(c) An ethylenically unsaturated monomer Also, a second gist of the invention is directed to a process for the production of aqueous coating composition which comprises producing water soluble resin (component C) by copolymerizing below-defined components (a) to (c) in organic solvent, adding aqueous colloidal silica (component B) and aqueous medium into the water soluble resin (component C) so as to replace the organic solvent by the aqueous medium, and producing the fine grains set at a ratio of the components (A) to (C) by weight, (A): (B): (C)=(45 to 85): (5 to 25): (10 to 30), wherein the aqueous resin (component A) comprising the ethylenically unsaturated monomer, and the aqueous colloidal silica (component B) are covered with the water soluble resin (component C) by adding the ethylenically unsaturated monomer into the water soluble resin (component C) and the aqueous colloidal silica (component B) in the aqueous medium and polymerizing therewith.

(a) An alkoxysilane monomer capable of radical polymerization
(b) A hydrophilic monomer having unsaturated double bond
(c) An ethylenically unsaturated monomer That is, inventors of the present invention piled up a series of researches in order to obtain exterior type coating material superior in not only contamination resistance, but also waterproof, weatherproof and coat strength. As a result, the inventors developed coated fine grains wherein emulsion polymer grains of the aqueous resin [component (A)] comprising an ethylenically unsaturated monomer and aqueous colloidal silica [component (B)] are covered with the water soluble resin [component (C)] comprising a special copolymer.

And the inventors reached the present invention by which the initial object was accomplished by employing such coated fine grains because each component can give full scope to one's property.

The present invention is now further described.

The aqueous coating composition of the present invention contains coated fine grains in aqueous medium, said coated fine grains can be obtained by employing specific resin (component A), aqueous colloidal silica (component B) and special water soluble resin (component C).

The specific aqueous resin (component A) comprises an ethylenically unsaturated monomer. As the ethylenically unsaturated monomer, there are vinyl acetate, alkyl ester acrylate, alkyl ester methacrylate, styrene, acrylonitrile, methacrylonitrile, acrylic acid, methacrylic acid, amides of acrylic acid, amides of methacrylic acid, methylol amides, alkoxymethyl amides, 2-hydroxyethyl acrylate, glycidyl methacrylate, divinylbenzene and the like. These are employed solely or in combination of two or more. In addition, chain transfer agent such as alkyl mercaptan is, as the case may be, employed together. In view of superior waterproof and weatherproof, especially, alkyl ester acrylate, alkyl ester methacrylate and styrene are preferable. Further, when employing two or more in combination, a combination of two or three selected from the group of alkyl ester acrylate, alkyl ester methacrylate and styrene is preferable since each property such as waterproof and weatherproof can be well balanced.

As the aqueous colloidal silica (component B), which is employed with the component A, conventional aqueous colloidal silica known to public can be employed without restriction. It is preferable to employ colloid wherein amorphous silica grains in about $0.02\mu$ diameter, which are usually negatively charged, are dispersed in a colloidal state. A positive ion such as $Na^+$ is often employed as a counter ion to stabilize the colloid.

The special water soluble resin (component C), which is employed with the components A and B, comprises a copolymer obtained by employing the following components (a) to (C).

(a) An alkoxysilane monomer capable of radical polymerization
(b) A hydrophilic monomer having unsaturated double bond
(c) An ethylenically unsaturated monomer The above component (a), the alkoxysilane monomer capable of radical polymerization, is shown in the following general formula (1).

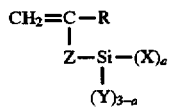
(1)

in which
R: —H or an alkyl group containing not more than 3 carbon atoms

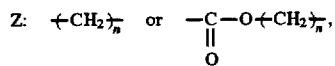

provided that a reference alphabet n represents 0 or an integer 1 to 3,

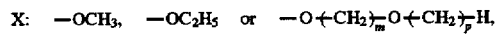

provided that reference alphabets m and p represent integer 1 to 3 respectively,

provided that a reference alphabet q represents 0 or an integer 0 to 3, and
a: an integer 1 to 3.

Among all, the following combination is especially preferable for the general formula (1) since reactivity and hydrolysis property of alkoxysilane are well balanced. For example, preferably, R is —H or —CH$_3$,

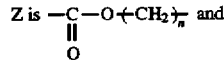

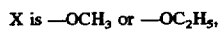

and a repetition number n is 3 and a is 2 or 3. Specifically, there are vinyltrimethoxysilane, vinyltriethoxysilane, vinyltris (β-methoxyethoxy) silane, 3-methacryloxy propyl trimethoxy silane, 3-methacryloxy propylmethyl dimethoxy silane, 3-methacryloxy propyl dimethyl methoxy silane, 3-methacryloxy propyltriethoxy silane, 3-methacryloxy propylmethyl diethoxy silane, and the like. These are employed solely or in combination of two or more. Especially, a preferable combination is the combination of 3-methacryloxy propyl trimethoxy silane and 3-methacryloxy propylmethyl dimethoxy silane due to easiness of controlling crosslinking.

The component (b), a hydrophilic monomer having unsaturated double bond, which has an effect to give hydrophilic property to the obtained polymer (component C), contains, for example, one or more selected from the group of carboxyl group, hydroxyl group, amide group, sulfone group and polyethylene oxide. As the monomer containing carboxyl group, there are acrylic acid, methacrylic acid, maleic acid, fumaric acid, itaconic acid, crotonic acid, and each metallic salt, each ammonium salt, each amine salt of the above acids, and the like. As the monomer containing hydroxyl group, there are 2-hydroxyethyl acrylate, 2-hydroxyethyl methacrylate, 2-hydroxypropyl acrylate, 2-hydoroxypropyl methacrylate, and the like. As the monomer containing amide group, acrylamide, methacrylamide, methylenebis acrylamide, methylenebis methacrylamide, N-methylol acrylamide, N-methylol methacrylamide, and the like. As the monomer containing amino group, there are dimethylaminoethyl acrylate, dimethylaminoethyl methacrylate, diethylaminoethyl acrylate, diethylaminoethyl methacrylate, dimethylaminopropyl acrylamide, dimethylaminopropyl methacrylamide, and the like.

As the monomer containing sulfone group, acryl sulfonic acid, methacryl sulfonic acid, 2-sulfoethyl acrylate, 2-sulfoethyl methacrylate, 2-acrylamide-2-methylpropane sulfonic acid, 2-methacrylamide-2-methylpropane sulfonic acid, and each alkali salt, each ammonium salt, each amine salt of the above acid and the like. As the monomer containing polyethlene oxide, there are acrylate with 2 to 50% of ethyleneoxide added therein, methacrylate with 2 to 50% of ethyleneoxide added therein, and the like. These are employed solely or in combination of two or more. Especially, it is preferable to adopt acrylic acid, methacrylic acid or maleic acid among the above compounds, because of relative easiness of polymerization and great grain stabilizing function. In the meantime, when employing two or more, the combination of acrylic acid and methacrylic acid is preferable due to good copolymerizing property.

As the component (c), ethylenically unsaturated monomer, the same monomer as mentioned in the above for the component (A) is employed. It is not necessary to employ the same for both.

For the combination of components (a), (b) and (c), which are constituents for the above component (C), it is especially preferable to adopt 3-methacryloxy propyl trymethoxy silane for (a), methacrylic acid or acrylic acid for (b) and methyl methacrylate or 2-ethyl hexyl acrylate for (c). A mixing ratio of those three is preferably set within (a): (b): (c)=1: 8: 77~10: 15: 91 by weight. That is, waterproof and contamination resistance tend to deteriorate when the ratio of (a) is below 1, whereas shelf life of the obtained aqueous emulsion composition tends to deteriorate when the ratio thereof is over 10. In the meantime, gelatinization tends to occur when the ratio of (b) is less than 8, whereas waterproof tends to deteriorate when the ratio thereof is over 15. Finally, the ratio of (c) was calculated from effective scopes of the above (a) and (b).

For example, the aqueous coating composition of the present invention may be prepared as follows. Namely, first of all, polymerization initiator is added to polymerization medium such as aqueous medium, organic solvent, and a mixture of those two, and then (a) an alkoxysilane monomer capable of radical polymerization, (b) a hydrophilic monomer having unsaturated double bond and (c) an ethylenically unsaturated monomer are added therein for polymerization so as to produce water soluble resin (component C). Consecutively, aqueous colloidal silica (component B) and the aqueous medium are added to the water soluble resin (component C) and the organic solvent is evacuated so as to be substituted completely by the aqueous medium. Then, a monomer, which is a constituent for the aqueous resin (component A) comprising the ethylenically unsaturated monomer, and the polymerization initiator are added therein for polymerization so that aqueous coating composition comprising coated fine grains and aqueous medium containing thereof, said coated fine grains having a structure that the aqueous resin (component A) comprising the ethylenically unsaturated monomer 1 and the aqueous colloidal silica (component B) 2 are covered with the water soluble resin (component C) 3 comprising copolymer can be produced. The diameters of thus obtained fine grains are preferably set within 0.03 to 0.20 μm, especially preferably 0.05 to 0.15 μm. That is, stability of the emulsion is bad when the diameters of the coated fine grains are too small, whereas a dense coat cannot be formed resulting in deterioration of waterproof and contamination resistance when they are too large.

In the combination of the components A to C, as a preferable combination of components A and B, the component A is alkyl acrylate, alkyl methacrylate, or styrene, while the component B is aqueous colloidal silica, which is negatively charged. In addition to the above combination, it is especially preferable to adopt 3-methacryloxy propyl trimethoxy silane for (a), methacrylic acid or acrylic acid for (b) and metyl methacrylate or 2-ethylhexyl acrylate for (c) because waterproof, contamination resistance and stability are well balanced.

It is necessary to set each ratio of the components (A), (B) and (C) at (A): (B): (C)=(45 to 85): (5 to 25): (10 to 30) by solid weight. Especially, it is preferable to set at (A): (B): (C)=(55 to 80): (10 to 20): (10 to 25). Namely, contamination resistance is bad when the ratio of the component (B) is less than 5, whereas film-forming deteriorats and chalking occurs when it is over 25. In the meantime, gelatinization occurs in polymerization when the ratio of the component (C) is less than 10, whereas contamination resistance deteriorates when it is over 30. Finally, the ratio of the component (A) was calculated from the effective scopes of the components (B) and (C).

As byproducts caused by reaction in the above process, fine grains wherein the only component (A) is covered with the component (C), or fine grains wherein the only component (B) is covered with the component (C), are produced and may be sometimes contained as foreign matters in the aqueous coating composition.

As the organic medium, organic solvent easily to solve into water is preferably employed. For example, there are aceton, methanol, ethanol, 2-propanol, 1-propanol, dioxane, ethylene glycol, propylene glycol, glycerin, methyl carbitol, ethyl carbitol, butyl carbitol, methyl cellosolve, ethyl cellosolve, butyl carbitol acetate, butyl propylene glycol, butyl propylene diglycol, and the like. These are employed solely or in combination of two or more.

As the polymerization initiator, there is organic peroxide such as benzoyl peroxide, t-butyl hydroperoxide, t-butyl peroxyisobutyrate, t-butyl peroxy (2 ethylhexoate), t-butyl peroxypivalate, t-butyl peroxyneodecanoate, cumyl peroxyoctoate, cumyl peroxyneohexanoate, cumyl peroxyneodecanoate, t-hexyl peroxyneohexanoate, t-hexyl peroxyneodecanoate, and the like. Besides, there are 2,2'-azobisisobutyronitrile, 2,2'-azobis (2-cyclopropyl propionitrile) and the like. These are employed solely or in combination of two or more. It is preferable to establish the mixing ratio of the polymerization initiator at 0.5 to 3% by weight to the entire monomer.

In the above manufacturing method, it is preferable for the combination of the organic solvent and the polymerization initiator to employ ethanol or 2-propanol as the organic solvent, in the meantime, to employ 2,2'-azobis isobutyronitrile as the polymerization initiator, because polymerized product can be formed stably.

Further, chain transfer agent may be employed appropriately according to the case in the present invention.

As the chain transfer agent, there are, for example, water soluble or hydrophobic alkyl mercaptans, and the like.

EFFECTS OF THE INVENTION

As mentioned in the above, in the present invention, specific three components (a) to (c) are copolymerized so as to produce the water soluble resin (component C), and then the aqueous colloidal silica (component B) and aqueous medium are added so as to replace the organic solvent by the aqueous medium. Consecutively, the ethylenically unsaturated monomer is added and polymerized into the water soluble resin (component C) and the aqueous colloidal silica (component B) in the aqueous medium so that the coated fine grains wherein the aqueous resin (component A) comprising the ethylenically unsaturated monomer and the aqueous colloidal silica (component B) are covered with the water soluble resin (component C) can be produced. In this way, aqueous coating composition wherein the coated fine grains are contained in the aqueous medium cam be produced, moreover, wherein the mixing ratio by weight of the components A to C are set up at a specific ratio. Therefore, the aqueous coating composition of the present invention is superior in contamination resistance, mainly rain-permeant contamination resistance, and further has good waterproof and weatherproof, and still further superior in coat strength. Namely, the painted film surface becomes hydrophilic due to the colloidal silica (component B) of fine grains contained in the aqueous coating composition of the present invention so that rain-permeant contamination can be prevented. Furthermore, since the colloidal silica (component B) is combined and captured by the water soluble resin (component C), which coexists in the fine grains, chalking by long-term exposure can be prevented.

Still furthermore, high coat strength can be obtained thanks to the toughness of the water soluble resin (component A) of emulsion polymers having high molecular weight, which coexists in the fine grains.

Now, examples are illustrated with comparative examples.

First, aqueous fine-grain-dispersed matter was produced in the following method. In addition, parts by weight is sometimes abbreviated as parts in the following examples [preparation of aqueous fine-grain-dispersed matter]

Raw materials for polymerization shown in the following tables 1 and 2 were put into a four neck flask equipped with stirring blades, a thermometer and a reflux condenser. Next, each of them was stirred at 80° C. for five hours for copolymerization. Consecutively, colloidal silica (Snowtex 50 from Nissan Chemical Industries, Ltd.) and water were mixed at a composition ratio shown in the following tables 1 and 2.

Further, organic solvent was distilled under reduced pressure so as to be replaced completely by water. Thus, aqueous fine-grain-dispersed matter was produced. Each concentration was 25 parts by weight.

TABLE 1

| | Aqueous fine-grain-dispersed matter (parts) | | | | |
|---|---|---|---|---|---|
| | W1 | W2 | W3 | W4 | W5 |
| Raw materials for polymerization | | | | | |
| Methyl methacrylate | 58 | 33 | 58 | 58 | 54 |
| 2-ethyl hexyl acrylate | 30 | 50 | 30 | 30 | 30 |
| Methacrylic acid | 10 | 15 | 10 | 10 | 10 |
| γ-methacryloxy propyl trimethoxy silane | 2 | 2 | 2 | 2 | 6 |
| THIO KALCOHL | 1 | 1 | 1 | 1 | 1 |
| Ethanol | 300 | 300 | 300 | 300 | 300 |
| 2,2'-azobisisobutyronitrile | 1 | 1 | 1 | 1 | 1 |
| Later mixing | | | | | |
| Colloidal silica* (Snowtex 50) | 100 (50) | 100 (50) | 160 (80) | 166 (83) | 100 (50) |
| Water | 400 | 400 | 460 | 466 | 400 |

NB:
*Each number in ( ) shows genuine amount.

TABLE 2

| | Aqueous fine-grain-dispersed matter (parts) | | | | |
|---|---|---|---|---|---|
| | W6 | W7 | W8 | W9 | W10 |
| Raw materials for polymerization | | | | | |
| Methyl methacrylate | 60 | 58 | 58 | 58 | 58 |
| 2-ethyl hexyl acrylate | 30 | 30 | 30 | 30 | 30 |
| Methacrylic acid | 10 | 10 | 10 | 10 | 10 |
| γ-methacryloxy propyl trimethoxy silane | — | 2 | 2 | 2 | 2 |
| THIO KALCOHL | 1 | 1 | 1 | 1 | 1 |
| Ethanol | 300 | 300 | 300 | 300 | 300 |
| 2,2'-azobisisobutyronitrile | 1 | 1 | 1 | 1 | 1 |
| Later mixing | | | | | |
| Colloidal silica* (Snowtex 50) | 100 (50) | 30 (15) | — | 172 (86) | 800 (400) |
| Water | 400 | 330 | 460 | 470 | 1100 |

NB:
*Each number in ( ) shows genuine amount.

EXAMPLES 1 TO 8

Each aqueous fine-grain-dispersed matter shown in the above table 1 was put into a four neck flask same as used in the above at mixing ratios shown in the following tables 3 and 4 respectively, and then water was added therein. Consecutively, each monomer and each polymerization-initiator aqueous solution at ratios shown in the following tables 3 and 4 were dropped therein at 80° C. by taking three hours. Further, reaction had been continued for another two hours so as to obtain aqueous emulsion. Still further, each concentration of emulsion was 45% by weight in examples 1 to 6, 40% by weight in example 7 and 35% by weight in example 8. Even further, diameters of thus obtained fine grains (measured by an electron microscope) are also shown in the following tables 3 and 4.

TABLE 3

| | EXAMPLES (parts) | | | |
|---|---|---|---|---|
| | 1 | 2 | 3 | 4 |
| Aqueous fine-grain-dispersed matter* | | | | |
| W1 | 120 (30) | 200 (50) | — | — |
| W2 | — | — | 120 (30) | — |
| W3 | — | — | — | 120 (30) |
| W4 | — | — | — | — |
| W5 | — | — | — | — |
| Methyl methacrylate | 53 | 53 | 53 | 53 |
| 2-ethyl hexyl acrylate | 45 | 45 | 45 | 45 |
| 3-methacryloxy propyl trimethoxy silane | 2 | 2 | 2 | 2 |
| Rongalite/Water | 0.2/10 | 0.2/10 | 0.2/10 | 0.2/10 |
| tert-butylhydroperoxide/Water | 0.2/5 | 0.2/5 | 0.2/5 | 0.2/5 |
| Water | 55 | 25 | 55 | 55 |
| Diameters of fine grains (μm) | 0.12 | 0.08 | 0.12 | 0.14 |

NB:
*Each number of ( ) shows genuine amount.

TABLE 4

| | EXAMPLES (parts) | | | |
|---|---|---|---|---|
| | 5 | 6 | 7 | 8 |
| Aqueous fine-grain-dispersed matter* | | | | |
| W1 | — | 72 (18) | — | — |
| W2 | — | — | — | — |
| W3 | — | — | 330 (82) | — |
| W4 | — | — | — | 490 (122) |
| W5 | 120 (30) | — | — | — |
| Methyl methacrylate | 53 | 53 | 53 | 53 |
| 2-ethyl hexyl acrylate | 45 | 45 | 45 | 45 |
| 3-methacryloxy propyl trimethoxy silane | 2 | 2 | 2 | 2 |
| Rongalite/Water | 0.2/10 | 0.2/10 | 0.2/10 | 0.2/10 |
| tert-butylhydroperoxide/Water | 0.2/5 | 0.2/5 | 0.2/5 | 0.2/5 |
| Water | 25 | 75 | 10 | 30 |
| Diameters of fine grains (μm) | 0.08 | 0.14 | 0.06 | 0.04 |

NB:
*Each number of ( ) shows genuine amount.

COMPARATIVE EXAMPLES 1 TO 7

The aqueous fine-grain-dispersed matter in the above table 2 was employed at ratios shown in the following tables 5 and 6. Except for this, the aqueous emulsion was obtained in the same way as that of example 1. Each concentration of emulsion was 45% by weight in comparative examples 1 to 6 and 30% by weight in comparative example 7. Even further, diameters of thus obtained fine grains (measured by an electron microscope) are also shown in the following tables 5 and 6.

COMPARATIVE EXAMPLE 8

The aqueous fine-grain-dispersed matter W10 shown in the above table 2 was employed as the aqueous emulsion.

TABLE 5

| | COMPARATIVE EXAMPLES (parts) | | | |
|---|---|---|---|---|
| | 1 | 2 | 3 | 4 |
| Aqueous fine-grain-dispersed matter* | | | | |
| W1 | 40 (10) | — | — | — |
| W6 | — | 120 (30) | — | — |
| W7 | — | — | 120 (30) | — |
| W8 | — | — | — | 120 (30) |
| W9 | — | — | — | — |
| W10 | — | — | — | — |
| Methyl methacrylate | 53 | 53 | 53 | 53 |
| 2-ethyl hexyl acrylate | 45 | 45 | 45 | 45 |
| 3-methacryloxy propyl trimethoxy silane | 2 | 2 | 2 | 2 |
| Longalite/Water | 0.2/10 | 0.2/10 | 0.2/1.0 | 0.2/10 |
| tert-butylhydroperoxide/Water | 0.2/5 | 0.2/5 | 0.2/5 | 0.2/5 |
| Water | 100 | 55 | 55 | 55 |
| Later mixing | | | | |
| Colloidal silica* (Snowtex 50) | — | — | — | 20 (10) |
| Water | — | — | — | 2 |
| Diameters of fine grains (μm) | 0.30 | 0.10 | 0.08 | 0.08 |

NB:
*Each number of ( ) shows genuine amount.

TABLE 6

| | COMPARATIVE EXAMPLES (parts) | | |
|---|---|---|---|
| | 5 | 6 | 7 |
| Aqueous fine-grain-dispersed matter* | | | |
| W1 | — | 56 (14) | — |
| W7 | — | — | — |
| W8 | 120 (30) | — | — |
| W9 | — | — | 840 (210) |
| Methyl methacrylate | 53 | 53 | 53 |
| 2-ethyl hexyl acrylate | 45 | 45 | 45 |
| 3-methacryloxy propyl trimethoxy silane | 2 | 2 | 2 |
| Rongalite/Water | 0.2/10 | 0.2/10 | 0.2/10 |
| tert-butylhydroperoxide/Water | 0.2/5 | 0.2/5 | 0.2/5 |
| Water | 55 | 82 | 77 |
| Later mixing | | | |
| Snowtex 50 | — | — | — |
| Water | — | — | — |
| Diameters of fine grains (μm) | 0.09 | 0.16 | 0.05 |

NB:
*Each number of ( ) shows genuine amount.

COMPARATIVE EXAMPLE 9

70 parts of water was put into a four neck flask same as used in the above and then below-mentioned monomer-dispersed liquid and polymerization-initiator aqueous solution were dropped therein at 80° C. by taking three hours. The aqueous composition was obtained by reaction therebetween for another two hours. Then, thus obtained aqueous composition was adjusted into pH8 by aqueous ammonia.

[Monomer-dispersed liquid]

| | |
|---|---|
| Methyl methacrylate | 53 parts |
| 2-ethyl hexyl acrylate | 41 parts |
| Methacrylic acid | 4 parts |
| γ-methacryloxy propyl trimethoxy silane | 2 parts |
| ELEMINOL JS-2 (from SANYO CHEMICAL INDUSTRIES) | 2 parts |
| Water | 20 parts |

[polymerization-initiator aqueous solution]

| | |
|---|---|
| Sodium persulfate | 0.3 parts |
| Water | 10 parts |

COMPARATIVE EXAMPLE 10

Aqueous mixture was obtained by mixing Snowtex 50 (from Nissan Chemical Industries, Ltd.) at 25% by weight as a solid ratio to the aqueous composition produced in comparative example 9. As a result of observing thus obtained aqueous mixture by an electron microscope, resin whose grain was in about 0.1 μm diameter, obtained by emulsion polymerization, and colloidal silica whose grain was in about 0.02 μm diameter, were mingled independently each other.

COMPARATIVE EXAMPLE 11

Aqueous composition was obtained by emulsion polymerizing each ingredient at ratios shown in the following table 7 in the presence of colloidal silica. The condition for reaction and the like was set up as same as that of comparative example 9. Thus obtained aqueous composition was adjusted to pH8 by aqueous ammonia. As a result of observing thus obtained aqueous mixture by an electron microscope, resin whose grain was in about 0.1 μm diameter, obtained by emulsion polymerization, and hard grains which were in about 0.02 μm diameter, were mingled independently each other.

TABLE 7

| | (parts) COMPARATIVE EXAMPLE 11 |
|---|---|
| Monomer dispersed liquid | |
| Methyl methacrylate | 53 |
| 2-ethyl hexyl acrylate | 41 |
| Methacrylic acid | 4 |
| 3-methacryloxy propyl trimethoxy silane | 2 |
| ELEMINOL JS-2 | 2 |
| Water | 20 |
| Charged preliminarily into a four neck flask | |
| Snowtex 50* | 50 (25) |
| Rongalite | 0.2 |
| Water | 100 |
| PER BUTYL H/Water | 0.2/5 |

*NB:
*Each number of ( ) shows genuine amount.

Performance evaluation was conducted on each of thus obtained examples and comparative examples. The results are shown in the following tables 9 to 13. In addition, each solid weight ratio of components (A), (B) and (C) is also shown in the following tables 9 to 13.

First, coating material was produced based upon the prescription of the following table 8 by employing each aqueous resin of obtained examples and comparative examples.

TABLE 8

| | (parts) | |
|---|---|---|
| Water | 9 | |
| Poiz 530 (from Kao Corporation) | 0.2 | mill |
| Titanium dioxide R630 (from Ishiharasangyo Kaisha Ltd.) | 30 | base |
| SN-Defoamer 373 (from Sun Nopco Ltd.) | 0.1 | |
| Aqueous resin (examples or comparative examples): The solid portion is 45% by weight. | 100* | |
| UH420 (from Asahidenka Kogyo K.K.) | 1.4 + α | |
| CS12 (from Chisso Corporation) | 8 + β | |
| Total | 148.7 | |

(NB)
*To unify PVC (Pigment Volume Concentration) of the coating material, solid portion of resin was increased in case that the solid portion was low.

Thus obtained coating material was painted in a wet state in about 1 mm thick on a slate plate wherein sealer had been painted preliminarily. Test samples were produced by drying thereof at a room temperature for one week. Contamination resistance, weatherproof, waterproof, coat strength and coat ductility were measured in accordance with the following method by employing the above test samples.

CONTAMINATION RESISTANCE

Test samples had been left outside for one year. Then, the degree of contamination was valued by visual inspection. Low degree of contamination is ○, middle degree is Δ and high degree is X. In addition, color difference was measured by a color-difference meter.

WEATHERPROOF

Each gloss retention (60° –60°) in 2,000 hours of test samples was measured by a sunshine weather meter, and also each color difference (ΔE) was measured by a deformation glossimeter and a color-difference meter respectively.

WATERPROOF

Waterproof was measured in accordance with a waterproof evaluating method, JIS K 5660. Before the waterproof treatment, paraffin had been painted on the surface of each test sample plate. Each glossiness of 60° –60° was measured by a deformation glossimeter and its gloss retention was valued as an indication of each waterproof.

COAT STRENGTH and COAT DUCTILITY

The coating material was formed into a film state in accordance with JIS A 6021, and then measured in accordance with the above JIS A 6021.

TABLE 9

| | EXAMPLES | | | |
|---|---|---|---|---|
| | 1 | 2 | 3 | 4 |
| Contamination resistance | | | | |
| Visual inspection | ○ | ○ | ○ | ○ |
| ΔE | 2.5 | 1.0 | 3.3 | 1.5 |
| Weatherproof | | | | |
| Initial glossiness (%) | 70 | 68 | 70 | 69 |
| Glosiness after treatment (%) | 62 | 60 | 61 | 61 |
| Gloss retention (%) | 89 | 88 | 87 | 88 |
| ΔE | 0.7 | 0.8 | 0.4 | 0.8 |
| Waterproof (%) | 98 | 95 | 98 | 97 |
| Coat strength (kg/cm²) | 120 | 150 | 400 | 150 |
| Coat ductility (%) | 200 | 150 | 400 | 150 |
| A ratio of three components (%) | | | | |
| component (A) | 77 | 67 | 77 | 77 |
| (B) | 8 | 11 | 8 | 10 |
| (C) | 15 | 22 | 15 | 13 |

TABLE 10

| | EXAMPLES | | | |
|---|---|---|---|---|
| | 5 | 6 | 7 | 8 |
| Contamination resistance | | | | |
| Visual inspection | ○ | ○ | ○ | ○ |
| ΔE | 0.8 | 3.6 | 0.6 | 0.5 |
| Weatherproof | | | | |
| Initial glossiness (%) | 67 | 71 | 64 | 63 |
| Glosiness after treatment (%) | 58 | 61 | 51 | 49 |
| Gloss retention (%) | 87 | 86 | 80 | 78 |
| ΔE | 0.8 | 0.5 | 0.5 | 0.5 |
| Waterproof (%) | 95 | 95 | 89 | 87 |
| Coat strength (kg/cm²) | 150 | 120 | 170 | 160 |
| Coat ductility (%) | 100 | 400 | 100 | 100 |
| A ratio of three components (%) | | | | |
| component (A) | 77 | 85 | 55 | 45 |
| (B) | 8 | 5 | 20 | 25 |
| (C) | 15 | 10 | 25 | 30 |

TABLE 11

| | COMPARATIVE EXAMPLES | | | |
|---|---|---|---|---|
| | 1 | 2 | 3 | 4 |
| Contamination resistance | | | | |
| Visual inspection | x | Δ | x | Δ |
| ΔE | 11.6 | 7.1 | 9.8 | 6.2 |
| Weatherproof | | | | |
| Initial glossiness (%) | 62 | 67 | 65 | 68 |
| Glosiness after treatment (%) | 48 | 51 | 51 | 29 |
| Gloss retention (%) | 77 | 76 | 78 | 43 |
| ΔE | 1.4 | 0.6 | 1.4 | 1.3 |
| Waterproof (%) | 68 | 91 | 93 | 80 |
| Coat strength (kg/cm²) | 100 | 120 | 110 | 120 |
| Coat ductility (%) | 100 | 150 | 100 | 200 |
| A ratio of three components (%) | | | | |
| component (A) | 6 | 77 | 77 | 72 |
| (B) | 3 | 8 | 3 | 7 |
| (C) | 91 | 15 | 20 | 21 |

TABLE 12

| | COMPARATIVE EXAMPLES | | | |
|---|---|---|---|---|
| | 5 | 6 | 7 | 8 |
| Contamination resistance | | | | |
| Visual inspection | × | × | ○ | * |
| ΔE | 12.3 | 10.5 | 2.1 | * |
| Weatherproof | | | | |
| Initial glossiness (%) | 75 | 70 | 64 | * |
| Glosiness after treatment (%) | 67 | 60 | 42 | * |
| Gloss retention (%) | 86 | 86 | 66 | * |
| ΔE | 1.5 | 1.3 | 0.9 | * |
| Waterproof (%) | 95 | 75 | 60 | * |
| Coat strength (kg/cm$^2$) | 80 | 50 | 200 | * |
| Coat ductility (%) | 250 | 400 | 50 | * |
| A ratio of three components (%) | | | | |
| component (A) | 77 | 88 | 35 | — |
| (B) | — | 4 | 30 | 80 |
| (C) | 23 | 8 | 35 | 20 |

(NB)
*Evaluation was impossible due to ramarkable cracks caused in forming a film.

TABLE 13

| | COMPARATIVE EXAMPLES | | |
|---|---|---|---|
| | 9 | 10 | 11 |
| Contamination resistance | | | |
| Visual inspection | × | ○ | ○ |
| ΔE | 10.6 | 4.1 | 3.6 |
| Weatherproof | | | |
| Initial glossiness (%) | 80 | 68 | 65 |
| Glosiness after treatment (%) | 70 | 31 | 29 |
| Gloss retention (%) | 88 | 46 | 45 |
| ΔE | 0.8 | 2.2 | 2.8 |
| Waterproof (%) | 91 | 70 | 71 |
| Coat strength (kg/cm$^2$) | 50 | 80 | 70 |
| Coat ductility (%) | 400 | 250 | 200 |
| A ratio of three components (%) | | | |
| component (A) | 100 | 80 | 80 |
| (B) | — | 20 | 20 |
| (C) | — | — | — |

As results from the above tables 9 to 13, comparative examples 1 to 4 were inferior in contamination resistance and weatherproof. Further, comparative examples 5, 6 and 9 were inferior in contamination resistance and coat strength. Furthermore, comparative example 7 was inferior in waterproof and had a weak coat. Still furthermore, comparative examples 10 and 11 were inferior in weatherproof and had low coat strength. On the other hand, any example was superior in all properties of contamination resistance, weatherproof and waterproof, and moreover, had high coat strength.

What is claimed is:

1. An aqueous coating composition wherein coated fine gains are contained in aqueous medium, each of said fine grains having a structure such that a mixture of below defined components (A) and (B), are covered with a below-defined component (C), characterized in that a ratio by weight for components (A) to (C) is set at (A): (B): (C)=(45 to 85): (5 to 25): (10 to 30) wherein (A) is an aqueous resin prepared from ethylenically unsaturated monomers selected from the group consisting of vinyl acetate, alkyl ester of acrylic acid, alkyl ester of methacrylic acid, styrene, acrylonitrile, methacrylonitrile, acrylic acid, methacrylic acid, amides of acrylic acid, amides of methacrylic acid, methylol amides, alkoxylmethyl amides, 2-hydroxyethyl acrylate, glycidyl methacrylate and divinylbenzene;

(B) is an aqueous colloidal silica;

(C) is a water soluble resin comprising a copolymer having a structural unit derived from below-defined components (a) to (c) as a molecular structure:
 (a) an alkoxysilane monomer capable of radical polymeriation;
 (b) a hydrophilic monomer having unsaturated double bond; and
 (c) another ethylenically unsaturated monomer.

2. Aqueous coating composition according to claim 1 wherein an alkoxysilane monomer as component (a) of component (C) is shown in the following formula:

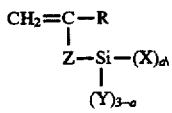

in which
R: —H or an alkyl group containing not more than 3 carbon atoms,

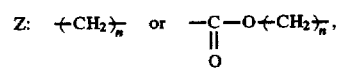

provided that n represents zero or an integer 1 to 3,

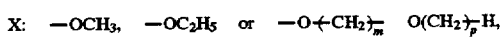

provided that m and p represent integer 1 to 3 respectively,

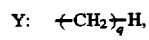

provided that q represents zero or an integer 1 to 3, and a: an integer 1 to 3.

3. An aqueous coating composition according to claim 1 wherein the diameters of the coated fine grains are 0.03 to 0.20 μm.

4. A process for the production of aqueous coating composition which comprises the steps of:
 producing a water soluble resin (component C) by copolymerizing below-defined
 components (a) to (c) in organic solvent:
 (a) an alkoxysilane monomer capable of radical polymerization
 (b) a hydrophilic monomer having unsaturated double bond
 (c) another ethylenically unsaturated monomer
 adding aqueous colloidal silica (component B) and aqueous medium into the water soluble resin (component C) so as to replace the organic solvent by the aqueous medium,
 adding thereto at least one ethylenically unsaturated monomers selected from the group consisting of vinyl acetate, alkyl ester of acrylic acid, alkyl ester of methacrylic acid, styrene, acrylonitrile, methacrylonitrile, acrylic acid, methacrylic acid, amides of acrylic acid, amides of methacrylic acid, methylol amides, alkoxylmethyl amides, 2-hydroxyethyl acrylate, glycidyl methacrylate and divinylbenzene (Component A);

and polymerizing the resultant mixture so as to produce coated fine grains set at a ratio of the components (A) (B) and (C) by weight, (A): (B): (C)=(45 to 85):(5 to 25):(10 to 30), wherein the aqueous resin A and the aqueous colloidal silica B are covered with the water soluble resin C.

5. A process for the production of aqueous coating composition according to claim 4 wherein the alkoxysilane monomer, component (a), is shown in the following formula:

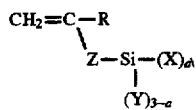

in which

R: —H or an alkyl group containing not more than 3 carbon atoms,

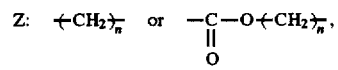

provided that n represents zero or an integer 1 to 3,

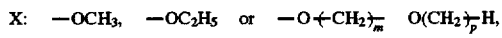

provided that m and p represent integer 1 to 3 respectively.

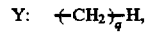

provided that q represents zero or an integer 1 to 3, and a: an integer 1 to 3.

6. A process for the production of aqueous coating composition according to claim 4 wherein the diameters of the coated fine grains are 0.03 to 0.20 μm.

* * * * *